United States Patent Office 3,492,356
Patented Jan. 27, 1970

3,492,356
METHOD OF RECOVERING ALDEHYDES AND KETONES
David W. Hall, Englewood, Colo., assignor to Marathon Oil Company, Findlay, Ohio, a corporation of Ohio
No Drawing. Filed May 31, 1966, Ser. No. 553,666
Int. Cl. C07c 45/24, 43/30
U.S. Cl. 260—590
8 Claims

ABSTRACT OF THE DISCLOSURE

Aldehydes or ketones are recovered from mixtures by converting the aldehyde or ketone in the mixture into its corresponding formal or ketal with an alcohol in the presence of an acid salt of a weakly basic nitrogen-containing compound or a complex of such a nitrogen-containing compound and removing the formed formal or ketal from the mixture.

---

The present invention relates to the recovery of aldehydes or ketones from their solutions or mixtures with other substances.

It is well recognized in the chemical industry that the commercial feasibility of numerous chemical processes frequently is dependent upon the recovery of unchanged or unreacted raw or starting materials. Thus, for example, in the preparation of chloromethylated aromatics or formaldehyde resins, a significant portion of the formaldehyde charge employed in carrying out these processes goes unchanged. Unless this unchanged or unreacted material is recovered, the economics of the processes can be adversely affected. While various methods, heretofore, have been developed for recovering unchanged formaldehyde in processes such as those referred to above, these prior methods have various disadvantages, particularly from the standpoint of the purity and yield of the recovered product.

In accordance with the present invention there is provided an efficient and effective method of recovering aldehydes and ketones from their mixtures which represents a marked advance over heretoforce used methods. The aldehydes or ketones initially are recovered in the form of formals or ketals in high purity and yield. The recovered products readily can be converted to the desired aldehyde or ketone, or in certain instances, especially in the case of formaldehyde, can be used in the form of the recovered formal.

In fulfilling the general objectives of the present invention, the aldehyde or ketone first is converted to its corresponding formal or katal in the presence of an acid salt or complex of a weakly basic nitrogen-containing compound. The formed formal or ketal is then separated from the reaction mixture. The conversion and recovery can be carried out in a continuous operation at relatively low temperatures in an aqueous or preferably an organic solvent medium. The highly pure formal or ketal obtained can be converted to the aldehyde or ketone by known procedures.

The processes of the present invention are especially useful for acid solutions which contain the aldehyde, for example, where a reaction generates an acidic by-product stream or phase which contains an aldehyde that is to be recovered.

It is an important advantage of the present invention that it is capable of recovering practically all of the aldehyde while converting much less of the alcohol to the less desirable alkyl-halide than usually occurs when alcohol is merely added to aldehyde solutions which contain a hydrogen halide, e.g. HCl.

The sequence in which the alcohol and acid salt or complex are added to a solution containing a carbonyl compound is not critical so long as the alcohol is added before substantial heating, either may be introduced first, or both may be added at the same time. In those instances where the method of this invention is used to recover aldehydes or ketones from waste liquors containing an alcohol, as well as an acid suitable for forming the acid salt or complex, it is only necessary to introduce a sufficient quantity of a nitrogen-containing compound to react with the acid in the solution. The thus formed acid salt or complex will function, under the temperature conditions employed, to catalyze the addition reaction between the carbonyl compound and the alcohol already present in the solution to form the corresponding formal or ketal. Exemplary of one chemical synthesis wherein the latter practice has special utility is described in co-pending application Ser. No. 458,432, filed May 24, 1965 and now Patent No. 3,360,583. That application, in its more specific aspects, discloses a multi-step method of preparing isoprene from the reaction of an alpha-haloether with an olefin. Paraformaldehyde, or other formaldehyde donor, is added at one stage in the synthesis. An economically significant amount of the formaldehyde charge goes unchanged and forms a part of an aqueous solution containing methanol and hydrochloric acid. By adding a weakly basic nitrogen-containing compound to this solution in accordance with the teaching of the present invention, an acid salt or complex is formed with the hydrochloric acid present in the solution which, under conditions hereinafter described, promotes a reaction between the formaldehyde and the methanol in the solution to form a formal, namely, methylal. The methylal can be removed in high purity and yield by distillation, and, thereafter, can be recycled as a formaldehyde donor, or hydrolyzed to obtain formaldehyde. The recovery of the unchanged formaldehyde in the isoprene synthesis, utilizing the method of this invention, represents an important cost reducing factor.

The alcohols employed in carrying out the method of this invention are characterized in that they are capable of forming stable or moderately stable formals or ketals with aldehydes or ketones. The alcohols should not contain functional groups which would tend to undergo side reactions to the exclusion of the desired formal or ketal formation. Correlatively, the aldehyde or ketone to be recovered should not carry functional groups which would appreciably inhibit formal or ketal formation. The alcohol, in addition, should preferably have a boiling point such that under the temperature conditions employed, any unreacted alcohol will not be carried overhead with the formed formal or ketal.

Various alcohols can be used to form formals and ketals in accordance with the method of the present invention. Apart from methanol, other lower alkyl alcohols having utility for this purpose are ethanol, propanols, butanols, and the like. Exemplary of aryl alcohols that can be used are benzyl alcohol, phenyl ethyl alcohol, phenyl propanol, and the like. Compatible mixtures of such alcohols may, of course, be employed.

The quantity of alcohol required to convert an aldehyde or ketone to the corresponding formal or ketal will be dependent upon the quantity of the carbonyl compound present in the solution. The generally optimum objectives of the invention are most advantageously attained with approximately stoichiometric or theoretical proportions of the alcohol and the carbonyl compound, namely, an alcohol to carbonyl compound molar ratio of about 2:1, with especially desirable results being obtained when the alcohol is present in slight excess, or in a molar ratio of alcohol to carbonyl compound of the order of 2.1 to 2.5 of the alcohol to 1 of the carbonyl compound.

The acid salt or complex used in the recovery method of the present invention may, as indicated, be introduced into the solution containing the carbonyl compound in a preformed state, or it can be formed in situ by simply adding a suitable quantity of an acid and a weakly basic nitrogen-containing compound to the solution. In the case where, as described above, the acid is already present in the solution, the nitrogen-containing compound, only, need be added to the solution, being certain that a sufficient quantity of the compound is used to react with all of the acid present thereby to prevent possible acid contamination of the formed formal or ketal or undesirable side reactions of the free acid with the carbonyl compound or alcohol.

The acid salt or complex having utility for the purposes of this invention is characterized in that it is essentially protonic, and is not dissociable under the conditions employed to the extent that any appreciable quantity of free acid will be present in the solution. The foregoing criteria most advantageously are met by weakly basic nitrogen-containing compounds such as amides, exemplified by N-methyl-2-pyrrolidone, n-ethyl - pyrrolidone, N-methyl-acetamide, dimethylformamide, and the like, and compatible mixtures thereof. Tertiary amides are especially preferred. Amides of this type react with acids to form salts or complexes which dissociate partially on heating at relatively low temperatures thereby to provide the catalytic conditions required to promote formal or ketal formation in the solutions. With hydrochloric acid, for example, such amides form salts or complexes will dissociate partially at temperatures in the range of from about 50° C. to about 200° C.

The nitrogen-containing bases most preferred for the reaction are those having base constants ($K_b$) in the range of from $10^{-10}$ to about $10^{-18}$, preferably $10^{-12}$ to $10^{-16}$, such as amides, particularly tertiary amides, as exemplified by N-methyl-2-pyrrolidone, N-ethyl-2-pyrrolidone, dimethylformamide and the like. Amides of this type react with acids such, for example, as hydrochloric acid, to form salts. In addition, such amides have vapor pressures which, generally speaking, are higher than that of the formed formal and do not therefore, interfere with withdrawal, as by distillation, of the formal from the reaction zone.

The acid salt or complex can be introduced into the solvent medium in a preformed state, or, in accordance with a particularly preferred practice of the invention, especially in those instances where the solvent employed consists essentially of an amide of the type described hereinabove, it can be formed in situ by simply adding a suitable quantity of an acid to the solvent. The acid utilized in forming the acid salt or complex should of course, be capable of providing a salt or complex having the required characteristics for carrying out the method. Exemplary of acids having utility for this purpose are mineral acids such as hydrochloric acid, sulfuric acid, and phosphoric acid; and organic acids having acid constants ($K_a$) of $10^{-4}$ or greater including para-toluenesulfonic acid.

The quantity of acid salt or complex employed in carrying out the method may vary within appreciable limits. Generally speaking, however, the acid salt or complex should comprise 0.01 to 1.0 and preferably 0.05 to 0.25 equivalent of $H^+$ per mole of nitrogen base sites of the solvent medium.

While not narrowly critical, in general from about 0.005 to about 5 and more preferably from 0.01 to about 0.30 equivalent of acid per mole of carbonyl compound (aldehyde or ketone) will be employed in most instances. Excess acidity can be conventionally neutralized where desirable.

Excess water can be removed conventionally, e.g. with a drying agent such as calcium chloride, after the addition of the weakly basic nitrogen compound.

The temperatures employed in carrying out the method of this invention also are variable. The objectives of the invention, however, are most advantageously realized when the temperature is maintained at a level such that the formed formal or ketal will continuously distill from the solution and thereby shift the equilibrium of the reaction between the alcohol and the carbonyl compound to completion. The temperature, furthermore, should be kept below the decomposition temperature of the formal or ketal. In those instances where decomposition may be a problem, removal of the formed formal or ketal can be performed at reduced pressures. Generally speaking, the temperatures used will be in the range of from about 50° C. to about 200° C. In the recovery of formaldehyde, for example, utilizing methanol and an acid salt or complex formed from N-methyl-2-pyrrolidone and hydrochloric acid, distillation of the formed methylal proceeds satisfactorily at a temperature of from about 80° C. to 95° C.

The following specific examples are illustrative of the practice of the present invention.

EXAMPLE I

To a 1-liter glass reaction vessel fitted with magnetic stirrer, thermometer and simple distillation apparatus are added 30 parts of 95% paraformaldehyde and 50 parts methanol. Thereafter, 300 parts of N-methyl-2-pyrrolidone containing 8 parts of anhydrous hydrochloric acid are added to the mixture. The mixture is brought to a temperature of 95° C. Methylal distills over immediately. The first fraction contains 58 grams of methylal and 1.8 grams of methyl chloride. The remaining portion of the reaction mixture is heated to 140° C. Another 3.8 grams of methylal and 3.1 grams of methyl chloride are collected. At this point 20 additional parts of methanol are added to the reaction mixture. Heating is continued at 140° C. and another 4 grams of methylal and 0.8 gram of methyl chloride are collected. The final yield of methylal is 85%.

EXAMPLE II

To a 1-liter reaction vessel equipped with a stirrer, a thermometer and simple distillation apparatus are added 100 parts of an aqueous solution comprising, by weight, 5% formaldehyde, 35% hydrochloric acid and 10% methanol. To this solution are added 10 parts of methanol and 200 parts of N-methyl-2-pyrrolidone. The resulting mixture is passed over $CaCl_2$ to remove excess water and then heated to 90° C. and methylal distills over immediately. After 30 minutes the reaction is stopped. Methylal is collected in good yield.

EXAMPLE III

Using the apparatus of Example II, a reaction mixture is formed of 30 parts paraformaldehyde, 80 parts ethanol, 100 parts N-methyl acetamide and 10 parts of para-toluenesulfonic acid. The mixture is heated to 110° C. Ethylal distills over and collected in good yield.

EXAMPLE IV

A mixture of benzaldehyde (50 parts) and ethylene glycol (45 parts) is added to N-(m-propyl)-2-pyrrolidone (150 parts) in the apparatus described in Example I. p-Toluenesulfonic acid (17 parts) is added and the mixture heated to 140° C. and stirred at that temperature for 2 hours. Then, the pressure is reduced and the temperature adjusted so that unchanged benzaldehyde and ethylene glycol are collected as a forecut. The product cut is collected at 95–102° C. at 10 mm. The benzaldehyde ethylene acetal is further purified by washing it with sodium carbonate solution and then drying it over anhydrous sodium sulfate solution.

EXAMPLE V

A mixture of dibenzyl ketone (210 parts), methanol (300 parts) and ethylene glycol (85 parts) is added to N-methyl-2-pyrrolidone (300 parts) in the apparatus described in Example I. The temperature is gradually raised to 130° C. and the bulk of the methanol present initially is reclaimed as an overhead distillate. At this point the mixture is cooled to room temperature and p-toluenesulfonic acid (16 parts) is added carefully. Heating is resumed; the mixture is maintained at 120° C. for 3 hours. The pressure is then reduced and excess dibenzyl ketone and ethylene glycol, as well as N-methyl-2-pyrrolidone solvent, are flashed and collected. The product distills at 203–206° C. at 20 mm. It was shown to be dibenzyl ketone ethylene ketal by infrared and MMR spectroscopic analyses.

EXAMPLE VI

To the apparatus of Example I is added a solution of enanthaldehyde (60 parts) in water (300 parts) containing hydrochloric acid (12 parts). N-methyl-2-pyrrolidone (300 parts) and benzene (250 parts) are added and the temperature raised until the bulk of the water present initially has been removed as the azeotrope with benzene. Ethanol (140 parts) is added and the mixture refluxed until the last traces of benzene are distilled overhead. Heating is continued at 120° C. for two more hours. The pressure is reduced and the more volatile components removed by flash distillation. A careful distillation of the residue then gives relatively pure enanthaldehyde diethyl acetal in a fraction collected at 204–206° C. at 20 mm.

EXAMPLE VII 4,4-dimethyl-m-dioxane (45 g. of 97.4% pure material; 0.357 mole) was charged to the apparatus of Example I which contained 220 g. of an N-methyl-2-pyrrolidone solution which was 4% by weight of HCl. To this mixture was added methanol (32 g.; 1 mole); heating at 120° C. for 5 hours caused the formation of isoprene and formaldehyde. The formaldehyde reacted as soon as it was split from the 4,4-dimethyl-m-dioxane with methanol to give methylal. Isoprene (16.3 g.) and methylal (16.2 g.) were collected in the overhead distillate. After heating an additional six hours at 120–140° C. there was collected an additional 1.9 g. of isoprene and 0.1 g. of methylal. The methylal collected represents a 60.5% recovery of the theoretical amount of formaldehyde possibly split out from the starting 4,4-dimethyl-m-dioxane.

What is claimed is:

1. A method of recovering aldehydes or ketones from mixtures comprising converting the aldehyde or ketone in the mixture into its corresponding formal or ketal with an alcohol in the presence of an acid salt of or complex of an organic amide with a strong acid, sufficient organic amide being present to form said salt or complex with all of the strong acid whereby said conversion takes place in the absence of any appreciable quantity of free acid, said organic amide being characterized in that it has a $K_b$ of from about $10^{-10}$ to about $10^{-18}$ and is a member of the group consisting of N-methyl-2-pyrrolidone, N-ethyl-2-pyrrolidone, N-(n-propyl)-2-pyrrolidone, N-methylacetamide and dimethylformamide, and mixtures thereof, and removing the formed formal or ketal from the mixture.

2. A method as claimed in claim 1 wherein the formation and removal of the formal or ketal is carried out at a temperature of from about 50° to about 200° C.

3. A method as claimed in claim 1 wherein the acid salt or complex comprises from about 0.01 to about 1.0 equivalent of $H^+$ per mole of nitrogen base sites in the mixture.

4. A method as claimed in claim 1 wherein the molar ratio of the alcohol to the carbonyl compound is between about 2.1 to 2.5 moles of the alcohol per mole of the carbonyl compound.

5. The method of claim 1 wherein the acid salt or complex is formed from N-methyl-2-pyrrolidone and hydrochloric acid.

6. The method of claim 5 wherein the aldehyde is formaldehyde and the alcohol is methanol.

7. The method of claim 6 wherein the temperature of the reaction mixture is in the range of from about 80° C. to about 95° C.

8. A method as claimed in claim 1 wherein the formal or ketal, after removal from the mixture, is converted to the corresponding aldehyde or ketone.

References Cited

Morrison et al.: Organic Chemistry, p. 557, 1965.

BERNARD HELFIN, Primary Examiner

U.S. Cl. X.R.

260—340.9, 615, 599, 606, 601, 681, 681.5; 252—426

PO-1050
(5/69)

UNITED STATES PATENT OFFICE
CERTIFICATE OF CORRECTION

Patent No. 3,492,356      Dated    Jan. 27, 1970

Inventor(s)    David W. Hall

It is certified that error appears in the above-identified patent and that said Letters Patent are hereby corrected as shown below:

Col. 1, line 43, "heretoforce" should read --heretofore--

Col. 1, line 52, "katal" should read --ketal--

Col. 2, line 56, "aryl alcohols" should read --aryl alkyl alcohols--

Col. 4, line 56, "and collected" should read --and is collected--

Col. 5, line 11, "MMR" should read --NMR--

SIGNED AND
SEALED
JUL 28 1970

(SEAL)
Attest:

Edward M. Fletcher, Jr.
Attesting Officer

WILLIAM E. SCHUYLER, JR.
Commissioner of Patents